United States Patent
Takeda

(10) Patent No.: US 11,156,718 B2
(45) Date of Patent: Oct. 26, 2021

(54) INFORMATION PROCESSING APPARATUS, CALCULATION METHOD, AND POSITIONING SYSTEM FOR CALCULATING INTEGER BIAS

(71) Applicant: SONY CORPORATION, Tokyo (JP)

(72) Inventor: Haruto Takeda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 307 days.

(21) Appl. No.: 16/068,864

(22) PCT Filed: Nov. 4, 2016

(86) PCT No.: PCT/JP2016/082869
§ 371 (c)(1),
(2) Date: Jul. 9, 2018

(87) PCT Pub. No.: WO2017/130513
PCT Pub. Date: Aug. 3, 2017

(65) Prior Publication Data
US 2019/0025434 A1     Jan. 24, 2019

(30) Foreign Application Priority Data
Jan. 27, 2016   (JP) .............................. JP2016-012912

(51) Int. Cl.
*G01S 19/04*     (2010.01)
*G01S 19/44*     (2010.01)
*G01S 19/05*     (2010.01)

(52) U.S. Cl.
CPC .............. *G01S 19/04* (2013.01); *G01S 19/05* (2013.01); *G01S 19/44* (2013.01)

(58) Field of Classification Search
CPC .......... G01S 19/04; G01S 19/06; G01S 19/43; G01S 19/44; H04W 64/003
See application file for complete search history.

(56) References Cited

U.S. PATENT DOCUMENTS

| 6,100,842 A * | 8/2000 | Dreier .................. G01S 19/071 |
| | | 342/357.41 |
| 8,686,901 B2 * | 4/2014 | Wirola ................... G01S 19/04 |
| | | 342/357.27 |

(Continued)

FOREIGN PATENT DOCUMENTS

| CN | 101680939 A | 3/2010 |
| EP | 2156208 A1 | 2/2010 |

(Continued)

OTHER PUBLICATIONS

International Search Report and Written Opinion of PCT Application No. PCT/JP2016/082869, dated Jan. 31, 2017, 08 pages of ISRWO.

*Primary Examiner* — Gregory C. Issing
(74) *Attorney, Agent, or Firm* — Chip Law Group

(57) ABSTRACT

An information processing apparatus including a GPS reception unit that receives a radio wave from a satellite and a processing unit that calculates an integer bias between a first reference station and the information processing apparatus on a basis of the radio wave from the satellite. The processing unit acquires an inter-reference-station integer bias between a second reference station different from the first reference station and the first reference station. The processing unit calculates an integer bias between the information processing apparatus and the second reference station on a basis of the integer bias between the first reference station and the information processing apparatus, and the inter-reference-station integer bias between the first reference station and the second reference station.

7 Claims, 10 Drawing Sheets

(56) References Cited

U.S. PATENT DOCUMENTS 8,803,735 B2 * 8/2014 McClure ............... G01S 19/071
        342/357.44
2010/0090890 A1 4/2010 Wirola et al.

FOREIGN PATENT DOCUMENTS

| JP | 2005-189059 A | | 7/2005 |
| KR | 10-2009-0071783 A | | 7/2008 |
| KR | 20090071783 A | * | 7/2009 |
| WO | 2008/142485 A1 | | 11/2008 |

* cited by examiner

INFORMATION PROCESSING APPARATUS, CALCULATION METHOD, AND POSITIONING SYSTEM FOR CALCULATING INTEGER BIAS

CROSS REFERENCE TO RELATED APPLICATIONS

This application is a U.S. National Phase of International Patent Application No. PCT/JP2016/082869 filed on Nov. 4, 2016 which claims priority benefit of Japanese Patent Application No. JP 2016-012912 filed in the Japan Patent Office on Jan. 27, 2016. Each of the above-referenced applications is hereby incorporated herein by reference in its entirety.

TECHNICAL FIELD

The present disclosure relates to an information processing apparatus, a calculation method, and a positioning system.

BACKGROUND ART

In recent years, attention has been paid to interferometric positioning in which the phases of radio waves (carriers) from a GPS satellite are measured between two spots including a reference station whose position is known and an unknown spot whose position is unknown, and the measured observation value is used for positioning. In interferometric positioning, a path difference of carriers between the two spots is obtained, and the relative position of the unknown spot from the reference station is calculated to measure the position of the unknown spot. The accuracy of measuring distance with carrier phases is high, and it is possible in interferometric positioning to perform positioning with accuracies of approximately several millimeters to several centimeters.

Patent Literature 1 discloses a vehicle including a GPS reception unit as a positioning apparatus that performs the above-described interferometric positioning. The vehicle disclosed in Patent Literature 1 is classified into a reference vehicle and a non-reference vehicle. The non-reference vehicle uses interferometric positioning to calculate the relative position with respect to the reference vehicle.

CITATION LIST

Patent Literature

Patent Literature 1: JP 2009-264844A

DISCLOSURE OF INVENTION

Technical Problem

A positioning apparatus as disclosed in Patent Literature 1 uses only an observation value of a specific reference station to perform interferometric positioning. Such a positioning apparatus makes a complicated calculation to decide (i.e., initialize) an integer bias when the positioning apparatus moves to switch the reference station for interferometric positioning.

The present disclosure then proposes a novel and improved information processing apparatus, calculation method, and positioning system capable of calculating an integer bias according to a simple calculation when the information processing apparatus switches reference stations.

Solution to Problem

According to the present disclosure, there is provided an information processing apparatus including: a GPS reception unit configured to receive a radio wave from a satellite; and a processing unit configured to calculate an integer bias between a first reference station and the information processing apparatus on a basis of the radio wave from the satellite. The processing unit acquires an inter-reference-station integer bias between a second reference station different from the first reference station and the first reference station. The processing unit calculates an integer bias between the information processing apparatus and the second reference station on a basis of the integer bias between the first reference station and the information processing apparatus, and the inter-reference-station integer bias between the first reference station and the second reference station.

Advantageous Effects of Invention

As described above, according to the present disclosure, it is possible to calculate an integer bias according to a simple calculation when an information processing apparatus switches reference stations.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
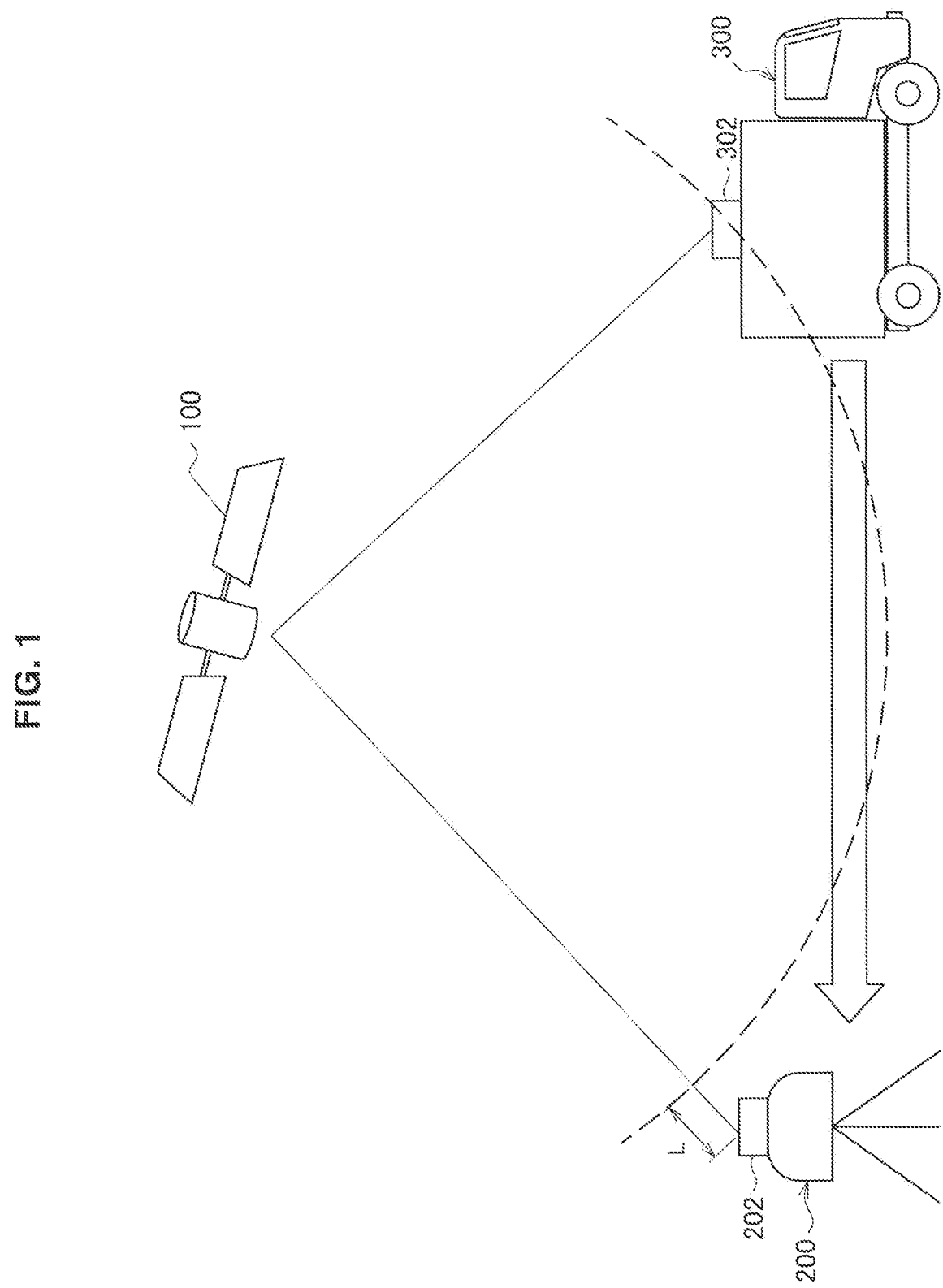
FIG. 1 is a schematic diagram that describes a principle of interferometric positioning.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be made in the following order.
0. Principle of Interferometric Positioning
1. Method of Calculating Integer Bias
2. Example of System Configuration
3. Configuration of Mobile Station
4. Operation Example in which Mobile Station Switches Reference Stations
5. Operation Example in which Mobile Station Verifies Inter-Reference-Station Integer Bias
6. Another System Configuration of the Present Disclosure
7. Supplemental Information
8. Conclusion

0. Principle of Interferometric Positioning

FIG. 1 is a diagram illustrating the principle of interferometric positioning. FIG. 1 illustrates a GPS satellite 100, a reference station 200 whose position is known, and a mobile station 300 whose position is unknown. Note that the mobile station 300 is an example of an information processing apparatus that receives radio waves from the GPS satellite 100 for positioning. The reference station 200 and the mobile station 300 respectively include GPS reception units 202 and 302 that receive radio waves from the GPS satellite 100.

The GPS satellite 100 makes predetermined orbits, and the position of the GPS satellite 100 is known. The GPS satellite 100 transmits radio waves of an L1 band (1575.42 MHz) and an L2 band (1227.6 MHz). The reference station 200 and the mobile station 300 use the GPS reception units 202 and 302 to observe the radio waves transmitted from the GPS satellite 100, and observe the carrier phases and the pseudorange (distance obtained by adding an error to the true distance from the GPS satellite 100 to the GPS reception units 202 and 302).

In general, in interferometric positioning, the reference station 200 transmits the observed observation values (carrier phase and pseudorange) and positional information of the reference station 200 to the mobile station 300. The mobile station 300 uses the observation values of the reference station 200 and the observation values observed by the mobile station 300 itself to calculate the relative position of the mobile station 300 with respect to the reference station 200. The position of the mobile station 300 is hereby measured. With reference to FIG. 1, the following describes the principle of interferometric positioning in more detail.

The dashed line illustrated in FIG. 1 represents an equidistant plane from the GPS satellite 100. L of FIG. 1 means a path difference between the path between the GPS satellite 100 and the GPS reception unit 202 of the reference station 200, and the path between the GPS satellite 100 and the GPS reception unit 302 of the mobile station 300. The path difference L illustrated in FIG. 1 is the sum of the length of an integer number of cycles of a carrier of the GPS satellite 100 and the length of the fraction corresponding to a phase angle θ. Here, the number of cycles of carriers included between the GPS satellite 100 and the GPS reception units 202 and 302 is generally referred to as integer bias.

In interferometric positioning, carrier phases can be measured by the GPS reception units 202 and 302, and obtaining an integer bias is thus the same as obtaining a path difference. To obtain this integer bias, as described above, the GPS reception units 202 and 302 respectively included in the reference station 200 and the mobile station 300 observe radio waves from the same GPS satellite 100. Using the respective observation values from the GPS satellite 100 which are observed by the reference station 200 and the mobile station 300, the mobile station 300 then calculates an integer bias. In addition, the mobile station 300 uses the calculated integer bias to obtain the baseline vector illustrated by an arrow in FIG. 1. According to this baseline vector, the relative position of the mobile station 300 with respect to the reference station 200 is obtained.

Note that, as the wavelength of the carriers of the GPS satellite 100, the above-described L1 band has a wavelength of 19 cm, and the L2 band has a wavelength of 24 cm. The GPS reception units 202 and 302 have high accuracy of observing carrier phases. It is possible in interferometric positioning to perform positioning with carriers having such wavelength with accuracies of approximately several millimeters to several centimeters.

Interferometric positioning includes static positioning that is performed when the mobile station 300 is in a static state, and kinematic positioning that is performed when the mobile station 300 is in a dynamic state. The present disclosure chiefly describes kinematic positioning. In kinematic positioning, the mobile station 300 decides (i.e., initializes) an integer bias when beginning an observation, and performs positioning in a short time while the mobile station 300 is moving. The mobile station 300 moves, so that the mobile station 300 switches the reference stations 200 in accordance with a situation. The mobile station 300 then performs initialization whenever switching the reference stations 200.

1. Method of Calculating Integer Bias

Figure 2:
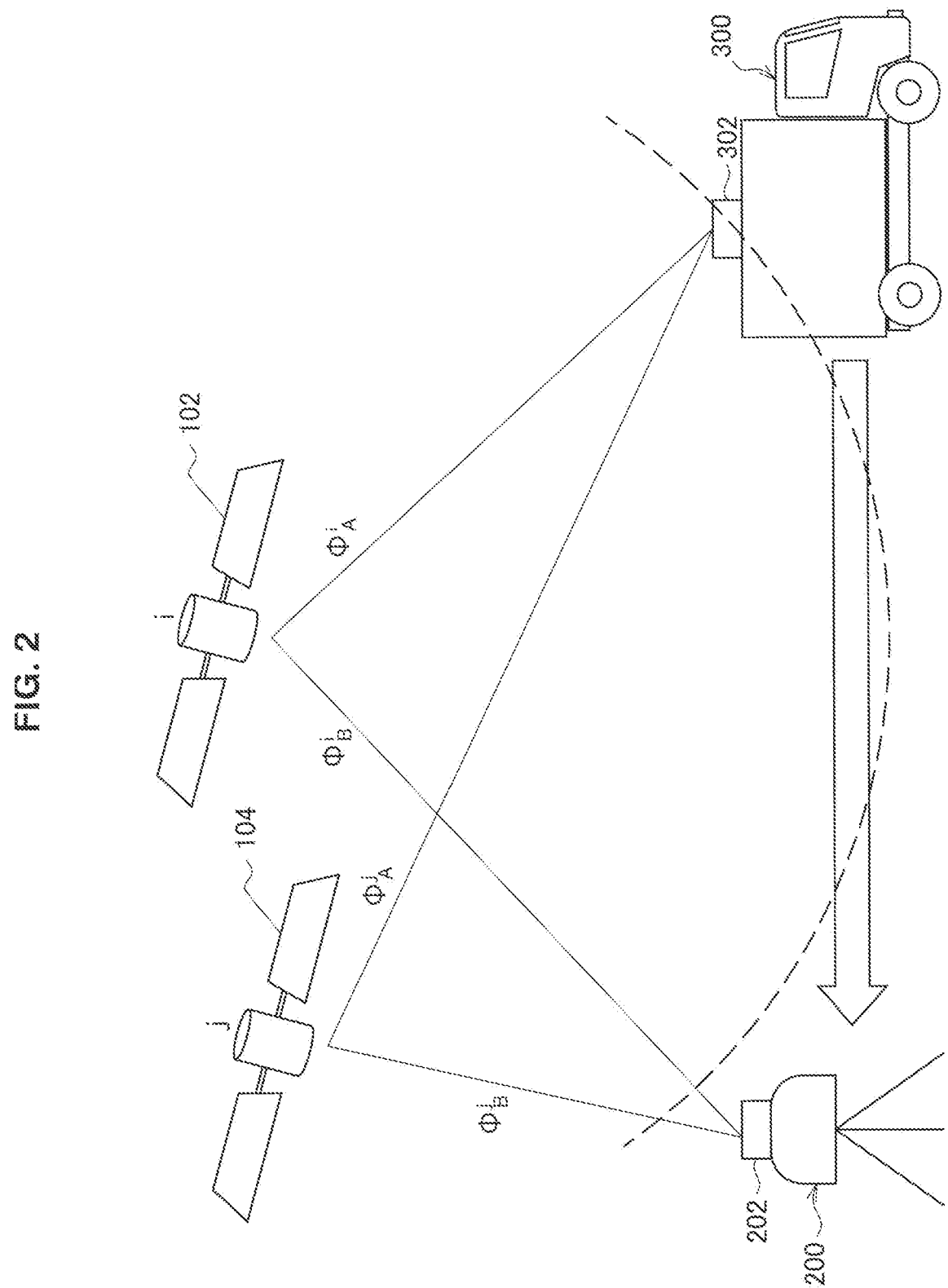
FIG. 2 is a schematic diagram that describes a principle for obtaining an integer bias in the interferometric positioning.

The above describes the basic principle of interferometric positioning. The following describes a method of calculating the above-described integer bias. Note that a calculation method is shown here in which the algorithm of the Kalman filter is applied, and kinematic positioning is performed. FIG. 2 is a diagram illustrating two GPS satellites including a GPS satellite i102 and a GPS satellite j104, the reference station 200, and the mobile station 300. In general, a carrier phase $\Phi_A^i$ from the GPS satellite i102 which is observed by the mobile station 300 is expressed as follows.

[Math. 1]

$$\Phi_A^i = \lambda^{-1} r_A^i + B_A^i - I + T + (\delta_A - \delta^i) \quad (1)$$

Here, a subscript A means the mobile station 300, and $r_A^i$ represents the geometric distance (true distance) between the GPS satellite i102 and the mobile station 300. In addition, I represents an ionospheric delay. T represents a tropospheric delay. $\delta_A$ represents a clock error of the GPS reception unit 302. $\delta^i$ represents a clock error of the GPS satellite i102. In addition, λ represents the wavelength of a carrier from the GPS satellite i102. $B_A^i$ represents an integer bias.

Next, a single phase difference is calculated from a formula (1) to cancel the ionospheric delay I, the tropospheric delay T, and the clock error $\delta_A$ of a receiver. The single phase difference is a difference between the carrier phases measured by the mobile station 300 from the GPS satellite i102 and the GPS satellite j104. It is then preferable to select a GPS satellite having a large angle of elevation as viewed from the mobile station 300 as the GPS satellite i102.

Figure 3:
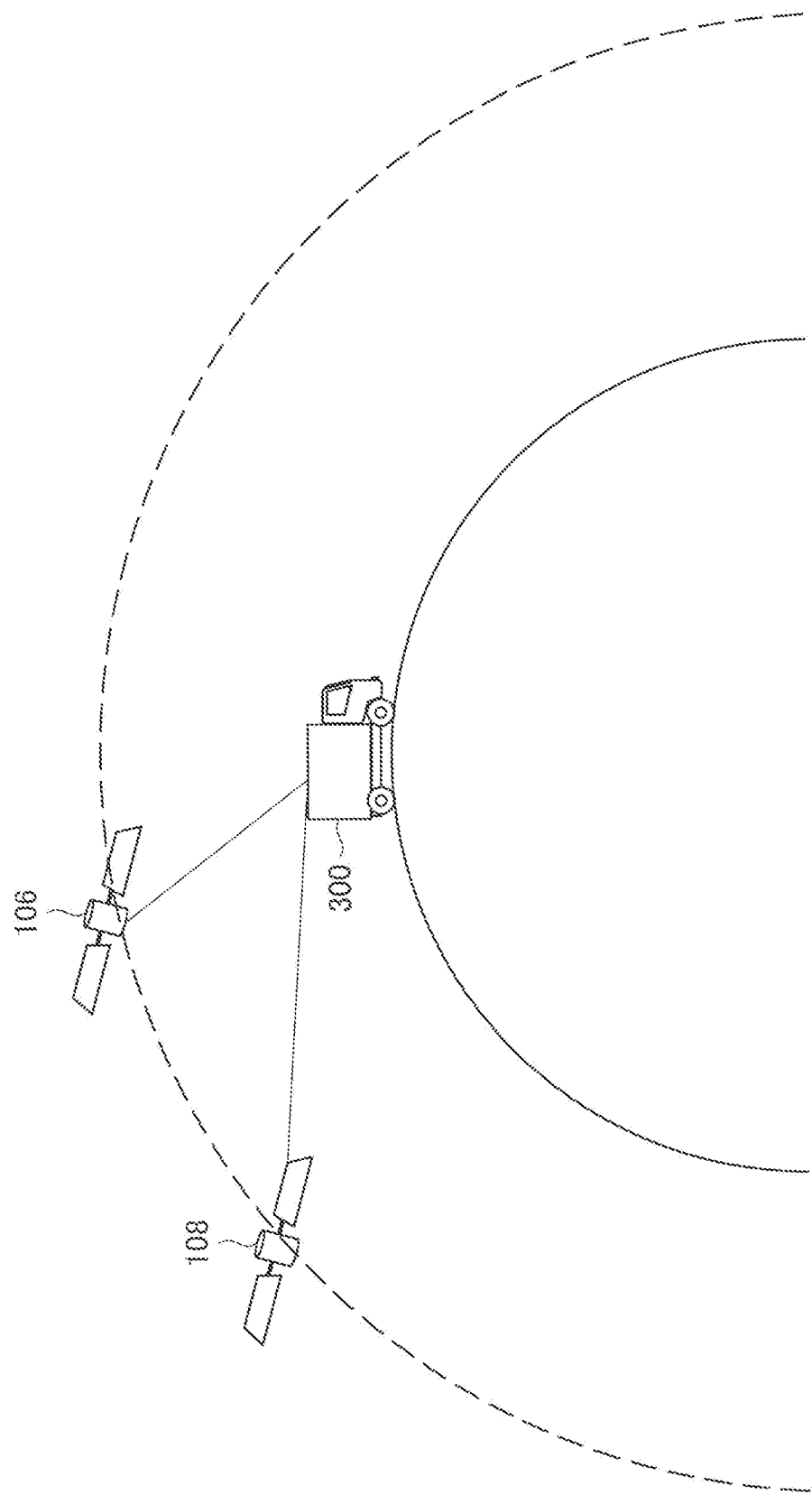
FIG. 3 is a diagram illustrating a path difference of radio waves at GPS satellites' angles of elevation as viewed from a mobile station.

FIG. 3 is a diagram illustrating an example of the relationship between the positions of two GPS satellites 106 and 108 and the position of the mobile station 300. The GPS satellite 106 represents a satellite having a relatively larger angle of elevation as viewed from the mobile station 300 than that of the GPS satellite 108. As understood from FIG. 3, a comparison between the distance between the mobile station 300 and the GPS satellite 106 and the distance between the mobile station 300 and the GPS satellite 108 shows that the distance between the mobile station 300 and the GPS satellite 106 is shorter. In this way, as a satellite has a larger angle of elevation as viewed from the mobile station 300, the distance of the ionosphere and the troposphere to be passed becomes shorter. Accordingly, the ionospheric delay I and the tropospheric delay T decrease. Therefore, in the case where observations are made in the reference station 200 and the mobile station 300 with a common GPS satellite, it is preferable to select a GPS satellite having a larger angle of elevation.

The method of calculating an integer bias will be described with reference to FIG. 2 again. A single phase difference $\Phi_A^{ij}$ between the GPS satellite i102 and the GPS satellite j104 described above is expressed with the following formula.

[Math. 2]

$$\begin{aligned} \Phi_A^{ij} &= \Phi_A^i - \Phi_A^j \\ &= \lambda^{-1} r_A^{ij} + \delta^{ij} + B_A^{ij} \end{aligned} \quad (2)$$

As understood from a formula (2), the single phase difference between the GPS satellite i102 and the GPS satellite j104 cancels a clock error on the receiver side. However, the single phase difference between the GPS satellite i102 and the GPS satellite j104 does not cancel clock errors on the GPS satellite sides. Therefore, to eliminate the clock errors on the GPS satellite sides, the double phase difference between the mobile station 300 and the reference station 200 is calculated.

The double phase difference $\Phi_{AB}^{ij}$ described above is expressed with the following formula.

[Math. 3]

$$\begin{aligned} \Phi_{AB}^{ij} &= \Phi_{AB}^i - \Phi_{AB}^j \\ &= \lambda^{-1}(r_{AB}^i - r_{AB}^j) + B_{AB}^{ij} \end{aligned} \quad (3)$$

Here, a subscript B means the reference station 200. In addition, M double phase differences are defined. M is less by one than K that is the number of GPS satellites used for positioning.

When the M double phase differences are defined as described above, a formula (3) above defines independent equations at time t as follows.

[Math. 4]

$$\begin{cases} \lambda(\Phi_{AB}^0 - \Phi_{AB}^1) = r_{AB}^0 - r_{AB}^1 + \lambda B_{AB}^{01} \\ \lambda(\Phi_{AB}^0 - \Phi_{AB}^2) = r_{AB}^0 - r_{AB}^2 + \lambda B_{AB}^{02} \\ \lambda(\Phi_{AB}^0 - \Phi_{AB}^1) = r_{AB}^0 - r_{AB}^1 + \lambda B_{AB}^{01} \\ \quad \vdots \\ \lambda(\Phi_{AB}^0 - \Phi_{AB}^M) = r_{AB}^0 - r_{AB}^M + \lambda B_{AB}^{0M} \end{cases} \quad (4)$$

The left side and the right side of each equation in a formula (4) above are calculated to define a matrix $z_n$ (observation errors at time $t_n$) as follows.

[Math. 5]

$$z_n = \begin{bmatrix} \lambda(\Phi_{AB}^0 - \Phi_{AB}^1) - (r_{AB}^0 - r_{AB}^1) - \lambda B_{AB}^{01} \\ \lambda(\Phi_{AB}^0 - \Phi_{AB}^2) - (r_{AB}^0 - r_{AB}^2) - \lambda B_{AB}^{02} \\ \lambda(\Phi_{AB}^0 - \Phi_{AB}^1) - (r_{AB}^0 - r_{AB}^1) - \lambda B_{AB}^{01} \\ \vdots \\ \lambda(\Phi_{AB}^0 - \Phi_{AB}^M) - (r_{AB}^0 - r_{AB}^M) - \lambda B_{AB}^{0M} \end{bmatrix} \quad (5)$$

Next, the relationship between the position of the mobile station 300 at the time $t_n$ and the position of the mobile station 300 at time $t_{n+1}$ is expressed with the amounts $\Delta x$, $\Delta y$, and $\Delta z$ of correction as follows.

[Math. 6]

$$\begin{cases} x(t_{n+1}) = x(t_n) + \Delta x \\ y(t_{n+1}) = y(t_n) + \Delta y \\ z(t_{n+1}) = z(t_n) + \Delta z \end{cases} \quad (6)$$

Here, $x(t_{n+1})$, $y(t_{n+1})$, and $z(t_{n+1})$ mean the coordinates of the mobile station 300 at the time $t_{n+1}$. $x(t_n)$, $y(t_n)$, and $z(t_n)$ mean the coordinates of the mobile station 300 at the time $t_n$.

In addition, similarly, the relationship between the value of an integer bias at the time $t_n$ and the value of an integer bias at the time $t_{n+1}$ is expressed with the integer bias's amount $\Delta B$ of correction as follows.

[Math. 7]

$$\begin{cases} B_{AB}^{01}(t_{n+1}) = B_{AB}^{01}(t_n) + \Delta B_{AB}^{01} \\ B_{AB}^{02}(t_{n+1}) = B_{AB}^{02}(t_n) + \Delta B_{AB}^{02} \\ \quad \vdots \\ B_{AB}^{0M}(t_{n+1}) = B_{AB}^{0M}(t_n) + \Delta B_{AB}^{0M} \end{cases} \quad (7)$$

When, with regard to the sight line direction from the mobile station 300 to a satellite, if the position of the GPS satellite i102 is taken to be $x^i$ ($x^i$ means the coordinates of the GPS satellite i102), and the position of the mobile station 300 is taken to be $x_A$ ($x_A$ means the coordinates of the mobile station 300), a unit vector $e_A^i$ is defined as follows.

[Math. 8]

$$e_A^i = \frac{x^i - x_A}{|x^i - x_A|} \quad (8)$$

In addition, when $e_A^i$ defined in a formula (8) is used for each GPS satellite used for positioning, a matrix H is defined as follows.

[Math. 9]

$$H = \begin{bmatrix} e_A^{0T} - e_A^{1T} \\ \vdots \\ e_A^{0T} - e_A^{MT} \end{bmatrix} \quad (9)$$

According to the formula described above, $z_n$ when t=n holds is expressed as follows.

[Math. 10]

$$z_n = [H_n \ \lambda I] \begin{bmatrix} \Delta x \\ \Delta B \end{bmatrix} \quad (10)$$

Here, I represents an identity matrix.

In addition, when the algorithm of the Kalman filter is applied to a formula (10) described above, the formula (10) is expressed with the following formula.

[Math. 11]

$$\begin{bmatrix} \Delta x \\ \Delta B \end{bmatrix} = PH^T (H^T PH + R)^{-1} z_n \quad (11)$$

Here, P represents a covariance matrix of state variables. R represents a covariance matrix of observation errors. In this way, the amounts Δx and ΔB of correction which are calculated by applying the algorithm of the Kalman filter are real numbers, and called Float solutions.

To convert the acquired Float solutions into integers (which are called Int solutions), Least-square Ambiguity Decorrelation Adjustment Method (LAMBDA Method) is typically used.

As described above, in interferometric positioning, the mobile station 300 that is an unknown spot uses the single phase difference and double phase difference between carriers to calculate an integer bias. The mobile station 300 can then perform kinematic positioning by using the calculated integer bias.

2. Example of System Configuration

The above describes the principle of interferometric positioning and the method of calculating an integer bias in detail. The following describes an example of a system configuration according to an embodiment of the present disclosure. In the present embodiment, an information processing apparatus will be described that receives radio waves from a satellite and performs information processing. Note that examples of the information processing apparatus include the mobile station 300 as illustrated in FIG. 4 which performs positioning while moving.

The system according to the present embodiment includes the GPS satellite 100, the reference station 200 whose position is known, the mobile station 300, a network 400, and a server 500. As described above, the GPS satellite 100 similarly emits radio waves. The reference station 200 and the mobile station 300 receive the radio waves emitted from the GPS satellite 100. The network 400 conveys information from the reference station 200 or the mobile station 300. The network 400 may be, for example, a public network such as the Internet, or a network such as a mobile telephone network which includes a wireless interface.

The position of the reference station 200 is known. The reference station 200 includes an apparatus that can measure a carrier phase from the GPS satellite 100. For example, the reference station 200 may be a structure such as a building, a traffic light, or a base station in a mobile telephone network which includes an apparatus that can measure a carrier phase from the GPS satellite 100 and is installed in the city. In addition, the reference station 200 may also be an electronic reference point installed by Geospatial Information Authority of Japan. Note that FIG. 4 illustrates only one reference station 200. However, a plurality of reference stations are installed in this system.

Figure 4:
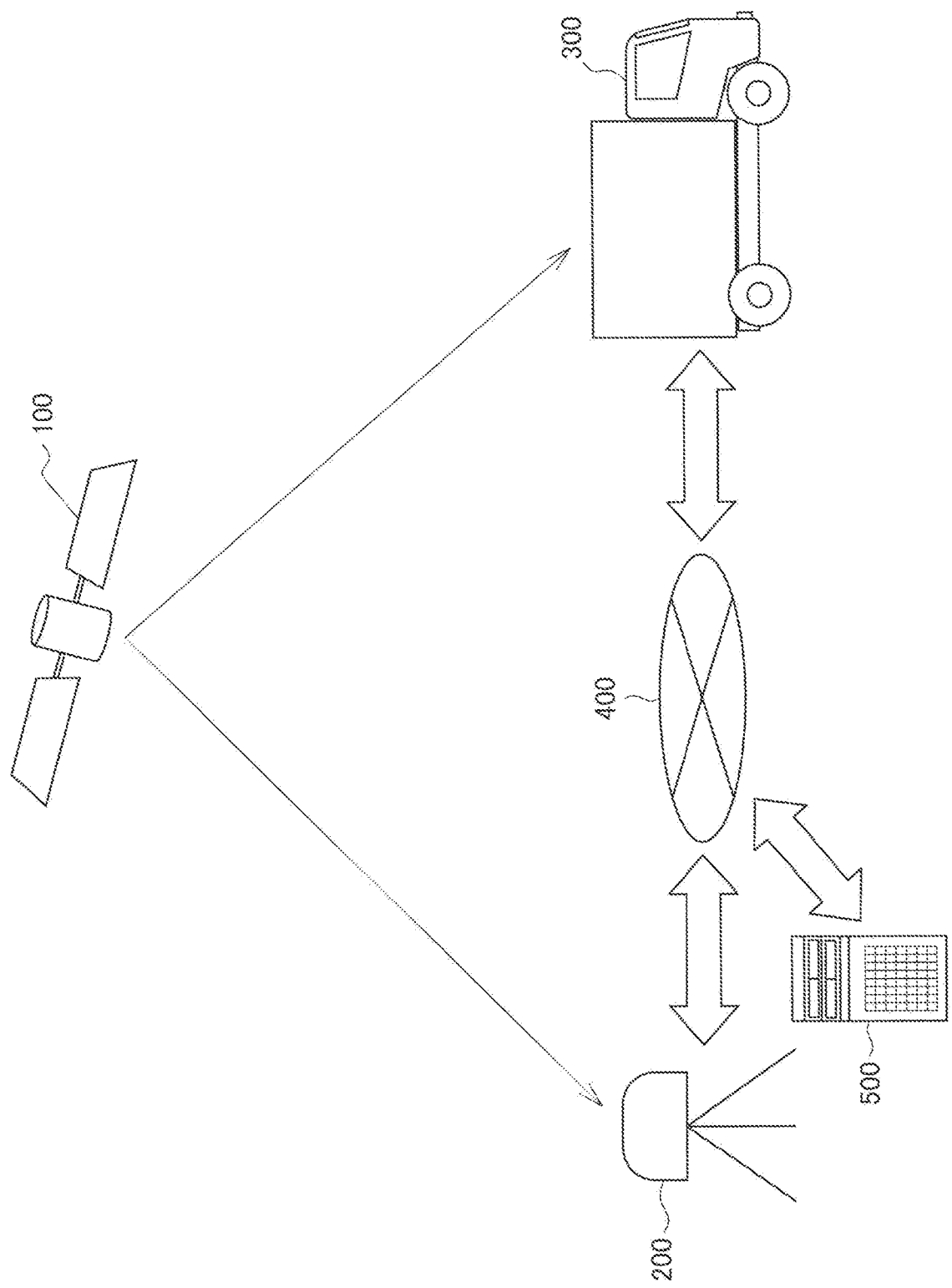
FIG. 4 is a schematic diagram illustrating a configuration of a system according to an embodiment of the present disclosure.

In addition, the mobile station 300 is illustrated as a vehicle in FIG. 4. However, in the present embodiment, the mobile station 300 is not limited to a vehicle. The mobile station 300 may be an apparatus such as a mobile phone or a game console which can be carried by a person. In addition, the mobile station 300 may be a ship. As long as the mobile station 300 is an apparatus that includes an apparatus which can measure a carrier phase from the GPS satellite 100, and is movable, the mobile station 300 may be any apparatus.

In addition, the mobile station 300 receives information regarding the observation values (carrier phase and pseudorange) of the reference station 200 and the position of the reference station 200 via the network 400, and uses the information from the reference station 200 and an observation value obtained by the mobile station 300 itself measuring radio waves from the GPS satellite 100 to perform interferometric positioning.

The server 500 receives the observation values observed by the reference station 200 from the reference station 200 via the network 400. In addition, the server 500 is configured to use the observation values received from the reference station 200 to calculate information used for positioning performed by the mobile station 300. The server 500 is configured to transmit the information used for positioning to the mobile station 300 via the network 400.

3. Configuration of Mobile Station

Figure 5:
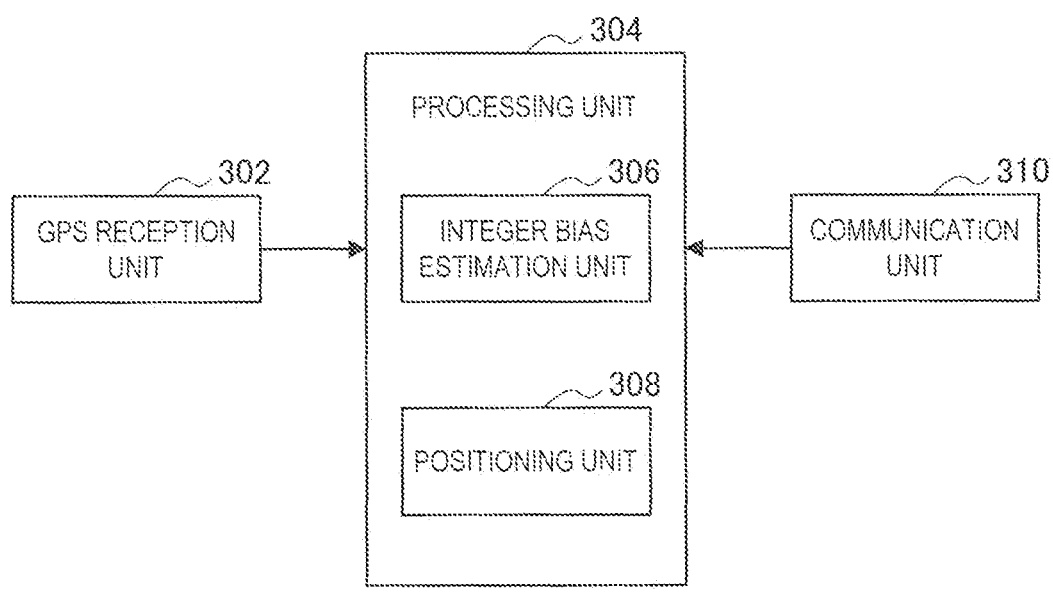
FIG. 5 is a block diagram illustrating a configuration of a mobile station according to an embodiment of the present disclosure.

The above describes the configuration example of the system according to an embodiment of the present disclosure. Next, the configuration of the mobile station 300 will be described in detail with reference to FIG. 5. The mobile station 300 includes the GPS reception unit 302, a processing unit 304, and a communication unit 310.

The GPS reception unit 302 receives radio waves from the GPS satellite 100, and sends information regarding the radio waves received from the GPS satellite 100 to the processing unit 304. The communication unit 310 is an apparatus used to wirelessly communicate with another apparatus. The communication unit 310 receives information regarding the observation values observed by the reference station 200 and the position of the reference station 200 from the reference station 200 via the network 400, and sends the received information to the processing unit 304. The communication unit 310 may be a transceiver used for a wireless LAN such as Bluetooth (registered trademark) or Wi-Fi, or a mobile telephone network such as Long Term Evolution (LTE).

In addition, the processing unit 304 includes an integer bias estimation unit 306 and a positioning unit 308. The integer bias estimation unit 306 estimates an integer bias on the basis of observation values based on radio waves received by the GPS reception unit 302 from a satellite and various kinds of information received from the communication unit 310. The positioning unit 308 performs positioning on the basis of the integer bias calculated by the integer bias estimation unit 306.

4. Operation Example in Which Mobile Station Switches Reference Stations

The above describes the configuration examples of the system and the mobile station 300 according to the present embodiment. The following describes an operation example in which the mobile station 300 switches the reference stations 200 for positioning.

Figure 6:
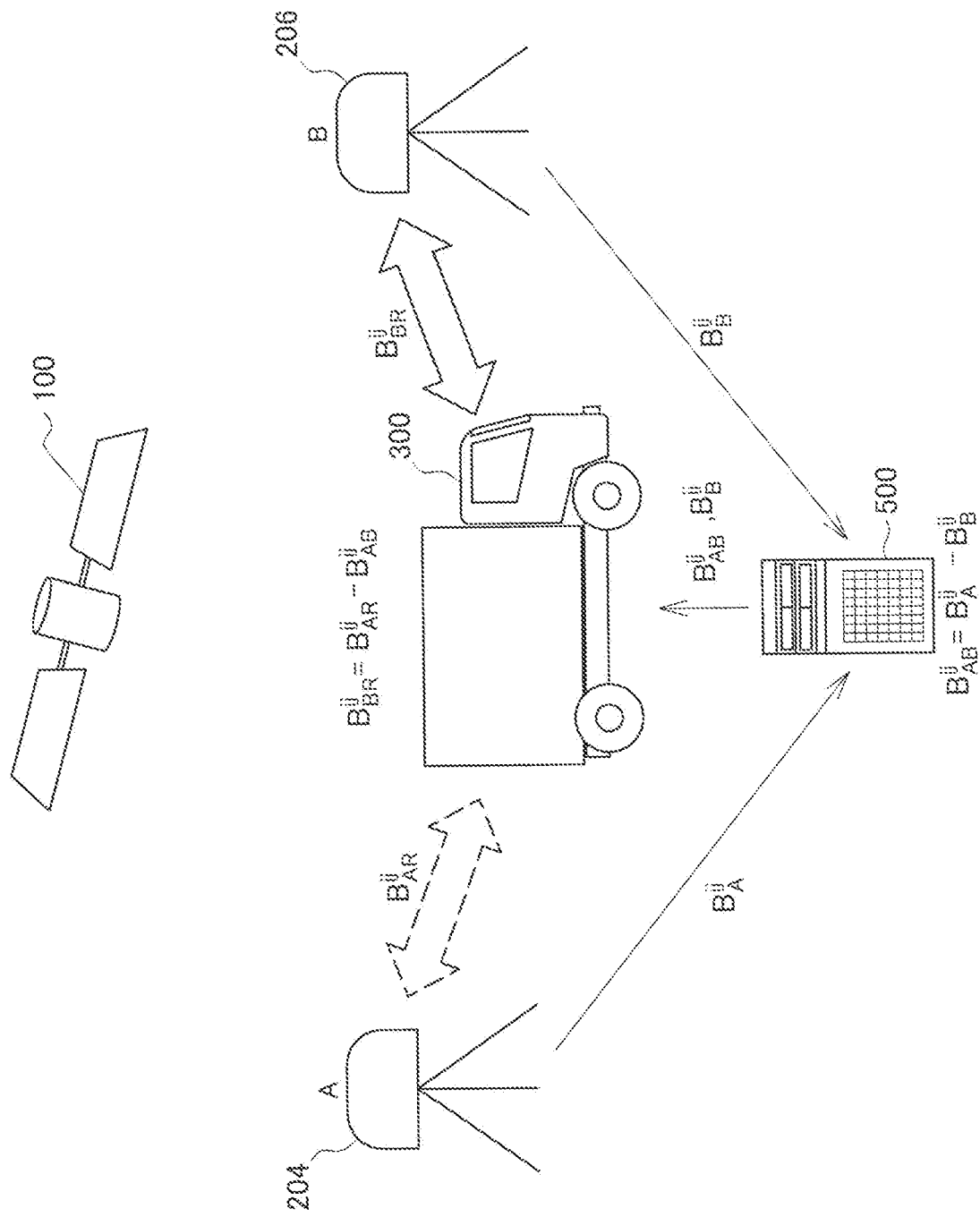
FIG. 6 is a diagram illustrating an operation example in which the mobile station switches reference stations in the present embodiment of the present disclosure.

FIG. 6 is a diagram illustrating the overview of the case where the mobile station 300 switches reference stations from a reference station A204 serving as a switching source to a reference station B206 serving as a switching destination. In FIG. 6, i and j represent GPS satellites. The subscript A represents the reference station A204 serving as a switching source. The subscript B represents the reference station B206 serving as a switching destination. In addition, a subscript R represents the mobile station 300.

First, the mobile station 300 performs kinematic positioning on the basis of the reference station A204 serving as a switching source. The integer bias estimation unit 306 of the mobile station 300 then estimates an integer bias $B_{AR}^{ij}$ between the reference station A204 serving as a switching source and the mobile station 300. In addition, the reference station A204 serving as a switching source continuously transmits an observation value $B_A^{ij}$ to the server 500. In addition, similarly, the reference station B206 serving as a switching destination continuously transmits an observation value $B_B^{ij}$ to the server 500.

Next, the mobile station 300 moves, and the mobile station 300 gets farther from the reference station A204 serving as a switching source. Meanwhile, once the mobile station 300 comes closer to the reference station B206 serving as a switching destination, the mobile station 300 switches the reference stations. In general, in interferometric positioning, the positioning accuracy becomes higher as the distance between the mobile station 300 and a reference station becomes shorter. This is because, once the distance between the mobile station 300 and a reference station becomes longer, the propagation status of radio waves received by the mobile station 300 from the GPS satellite 100 becomes considerably different from the propagation status of radio waves received by the mobile station 300 from the GPS satellite 100. This difference in propagation status reduces the effects of cancelling an ionospheric delay and a tropospheric delay described above, resulting in a greater positioning error. It is thus preferable for the mobile station 300 to perform kinematic positioning on the basis of a closer reference station.

In FIG. 6, as described above, when the mobile station 300 comes closer to the reference station B206 serving as a switching destination, the mobile station 300 performs kinematic positioning on the basis of the reference station B206 serving as a switching destination. The mobile station 300 then calculates $B_{BR}^{ij}$ that is an integer bias between the mobile station 300 and the reference station B206 serving as a switching destination.

Here, the server 500 uses the observation value $B_A^{ij}$ received from the reference station A204 serving as a switching source and the observation value $B_B^{ij}$ received from the reference station B206 serving as a switching destination to calculate an inter-reference-station integer $B_{AB}^{ij}$ bias between the reference station A204 serving as a switching source and the reference station B206 serving as a switching destination in accordance with the following formula. The server 500 then transmits the calculated inter-reference-station integer bias $B_{AB}^{ij}$ to the mobile station 300.

[Math. 12]

$$B_{AB}^{ij} = B_A^{ij} - B_B^{ij} \qquad (12)$$

The mobile station 300 receives and acquires the inter-reference-station integer bias $B_{AB}^{ij}$ from the server 500 via the communication unit 310. The integer bias estimation unit 306 uses the acquired inter-reference-station integer bias $B_{AB}^{ij}$ and the already calculated integer bias $B_{AR}^{ij}$ between the mobile station 300 and the reference station A204 serving as a switching source to calculate an integer bias $B_{BR}^{ij}$ between the mobile station 300 and the reference station B206 serving as a switching destination as follows.

[Math. 13]

$$B_{BR}^{ij} = B_{AR}^{ij} - B_{AB}^{ij} \qquad (13)$$

In this way, the mobile station 300 sets the calculated integer bias between the mobile station 300 and the reference station B206 serving as a switching destination as an initial value. The mobile station 300 then uses the observation value of the reference station B206 serving as a switching destination which is received from the server 500, and the observation value observed by the GPS reception unit 302 of the mobile station 300 to perform kinematic positioning with the reference station B206.

As described above, the integer bias estimation unit 306 calculates the integer bias $B_{BR}^{ij}$ between the mobile station 300 and the reference station B206 serving as a switching destination. The positioning unit 308 uses the calculated integer bias $B_{BR}^{ij}$ to perform kinematic positioning. In this way, the mobile station 300 uses the inter-reference-station integer bias $B_{AB}^{ij}$ to eliminate the necessity of initialization when switching the reference stations.

Figure 7:
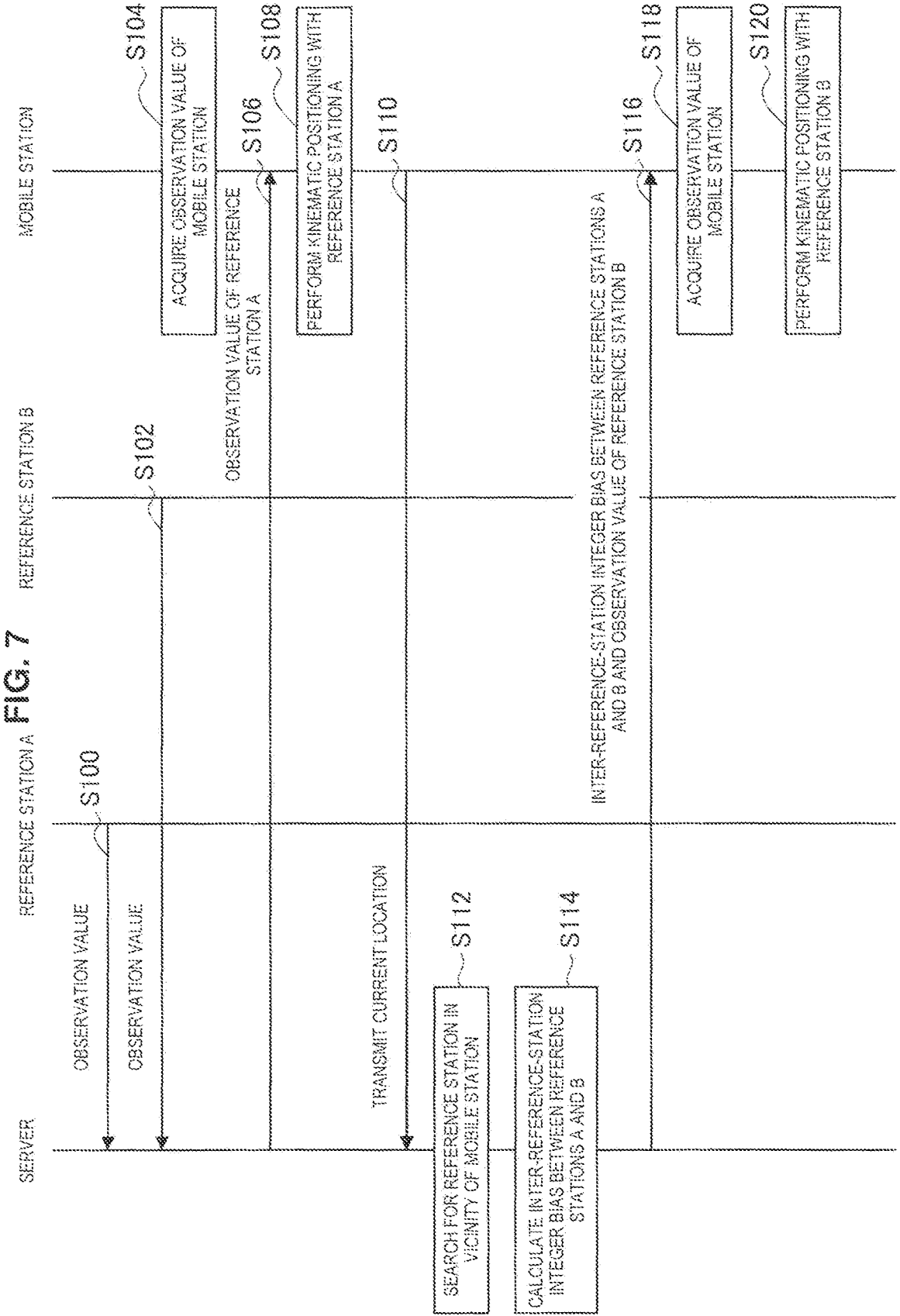
FIG. 7 is a sequence diagram illustrating an operation example in which the mobile station switches reference stations in the present embodiment of the present disclosure.

The above describes the overview of the operation of the system according to the present embodiment. With reference to FIG. 7, the following describes the above-described operation in detail. In S100, the reference station A204 that is a reference station serving as a switching source transmits an observation value $B_A^{ij}$ to the server 500. Similarly, in S102, the reference station B206 that is a reference station serving as a switching destination transmits an observation value $B_B^{ij}$ to the server 500. In addition, in S104, the mobile station 300 receives radio waves of a satellite with the GPS reception unit 302, and acquires an observation value.

Next, in S106, the server 500 transmits the observation value $E_A^{ij}$ of the reference station A204 to the mobile station 300. In S108, the mobile station 300 uses the observation value acquired in S104 and the observation value $E_A^{ij}$ of the reference station A204 which is received from the server 500, and performs kinematic positioning.

Next, in S110, the mobile station 300 transmits the current location of the mobile station 300 to the server 500. In S112, the server 500, which receives the current location of the mobile station 300, searches a plurality of installed reference stations for a reference station in the vicinity of the mobile station 300. Here, in the case where the reference station A204 is the closest reference station to the mobile station 300, the server 500 performs no operation. Meanwhile, in the case where the mobile station 300 moves afterward, and the server 500 determines on the basis of the current location of the mobile station 300 received after the mobile station 300 moves that the closest reference station to the mobile station 300 is the reference station B206, the server 500 performs the operation of S114.

In S114, the server 500 uses the observation value $B_A^{ij}$ of the reference station A204 and the observation value $B_B^{ij}$ of the reference station B206 to calculate an inter-reference-station integer bias $B_{AB}^{ij}$ between the reference station A204 and the reference station B206. In S116, the server 500 then transmits the calculated inter-reference-station integer bias $B_{AB}^{ij}$ and the observation value $B_B^{ij}$ of the reference station B206 to the mobile station 300.

The mobile station 300, which receives the inter-reference-station integer bias $B_{AB}^{ij}$ from the server 500, recognizes that the closest reference station is changed from the reference station A204 to the reference station B206. Next, in S118, the mobile station 300 receives radio waves of a satellite with the GPS reception unit 302 to acquire an observation value. In S120, the mobile station 300 then calculates an integer bias $B_{BR}^{ij}$ between the mobile station 300 and the reference station B206 on the basis of a formula (13) described above, and performs kinematic positioning in cooperation with the reference station B206 with the integer bias $B_{BR}^{ij}$ set as an initial value.

As described above, the mobile station 300 according to the present embodiment uses the inter-reference-station integer bias $B_{AB}^{ij}$ to eliminate the necessity of initialization when switching the reference stations. This allows for prompt positioning, and the mobile station 300 does not have to perform a complicated calculation for initialization. Further, the mobile station 300 can perform positioning with the closest reference station, and thus stably calculate an accurate integer bias and perform accurate positioning.

5. Operation Example in Which Mobile Station Verifies Inter-Reference-Station IntegeR Bias The above describes the operation example in which an inter-reference-station integer bias is used, and the mobile station 300 performs kinematic positioning. The following describes an operation example in which the mobile station 300 verifies this inter-reference-station integer bias.

Figure 8:
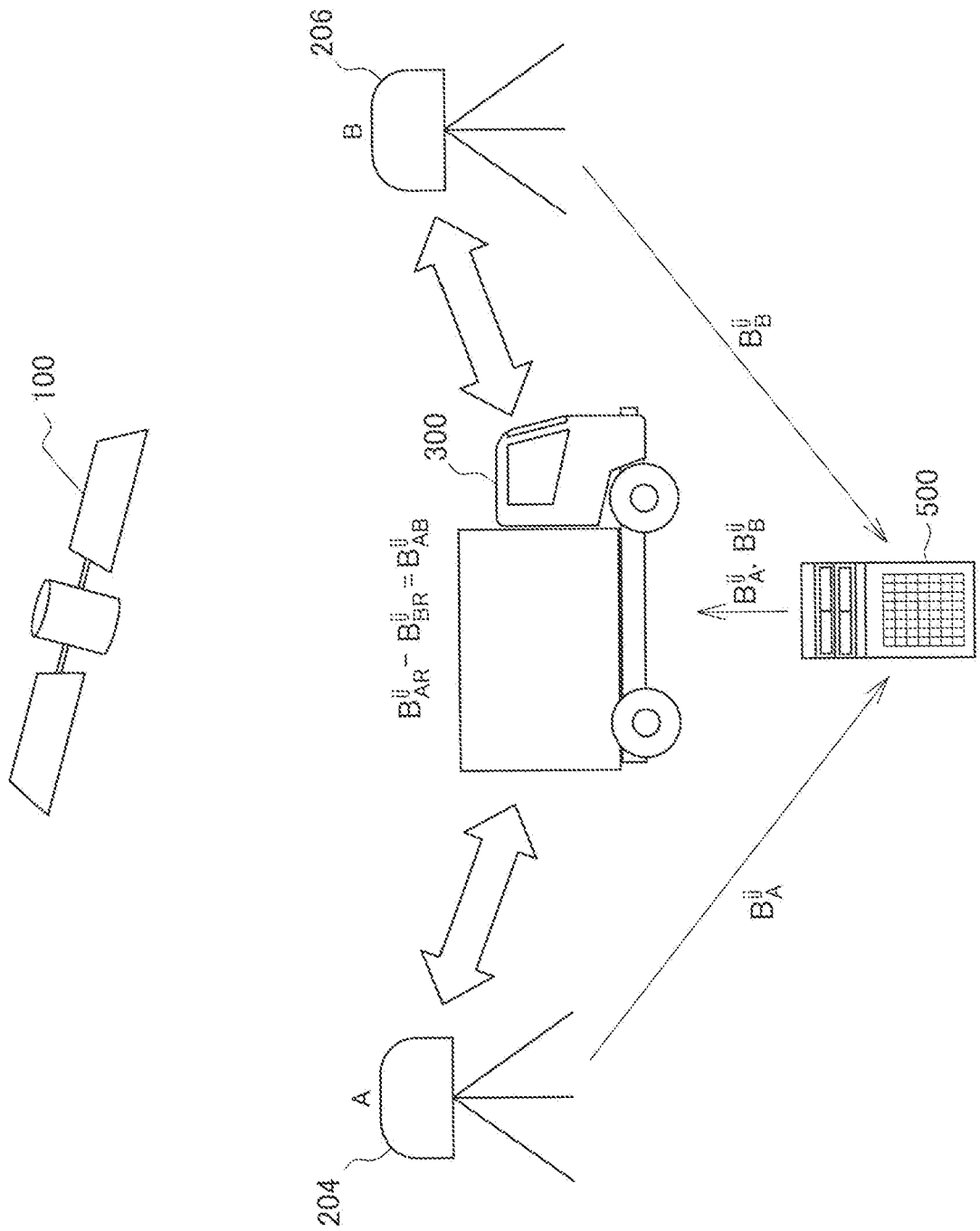
FIG. 8 is a diagram illustrating an operation example in which the mobile station verifies an inter-reference-station integer bias in the present embodiment of the present disclosure.

FIG. 8 is a schematic diagram illustrating the operation for the mobile station 300 to verify an inter-reference-station integer bias. As described above, the reference station A204 and the reference station B206 transmit the observation values $B_A^{ij}$ and $B_B^{ij}$ to the server 500. In addition, the server 500 transmits the received observation values $B_A^{ij}$ and $B_B^{ij}$ to the mobile station 300.

The mobile station 300 uses the observation values $B_A^{ij}$ and $B_B^{ij}$ received from the server 500 to perform kinematic positioning with the reference station A204 and the reference station B206, and obtains integer biases between both reference stations and the mobile station 300. That is, the positioning unit 308 of the mobile station 300 performs kinematic positioning with both reference stations to calculate the integer bias $B_{AR}^{ij}$ between the reference station A204 and the mobile station 300, and the integer bias $B_{BR}^{ij}$ between the reference station B206 and the mobile station 300.

The integer bias estimation unit 306 then uses the calculated integer biases $B_{AR}^{ij}$ and $B_{BR}^{ij}$ between the respective reference stations and the mobile station 300 to calculate the above-described inter-reference-station integer bias $B_{AB}^{ij}$ in accordance with the following formula.

[Math. 14]

$$B_{AR}^{ij} - B_{BR}^{ij} = B_{AB}^{ij} \qquad (14)$$

In this way, the mobile station 300 performs kinematic positioning with the two of the reference station A204 and the reference station B206, and verifies the inter-reference-station integer bias from the calculated integer biases, which makes it possible to improve the accuracy of the inter-reference-station integer bias. In addition, the improved accuracy of the inter-reference-station integer bias improves the accuracy of kinematic positioning that is finally performed by the mobile station 300.

Figure 9:
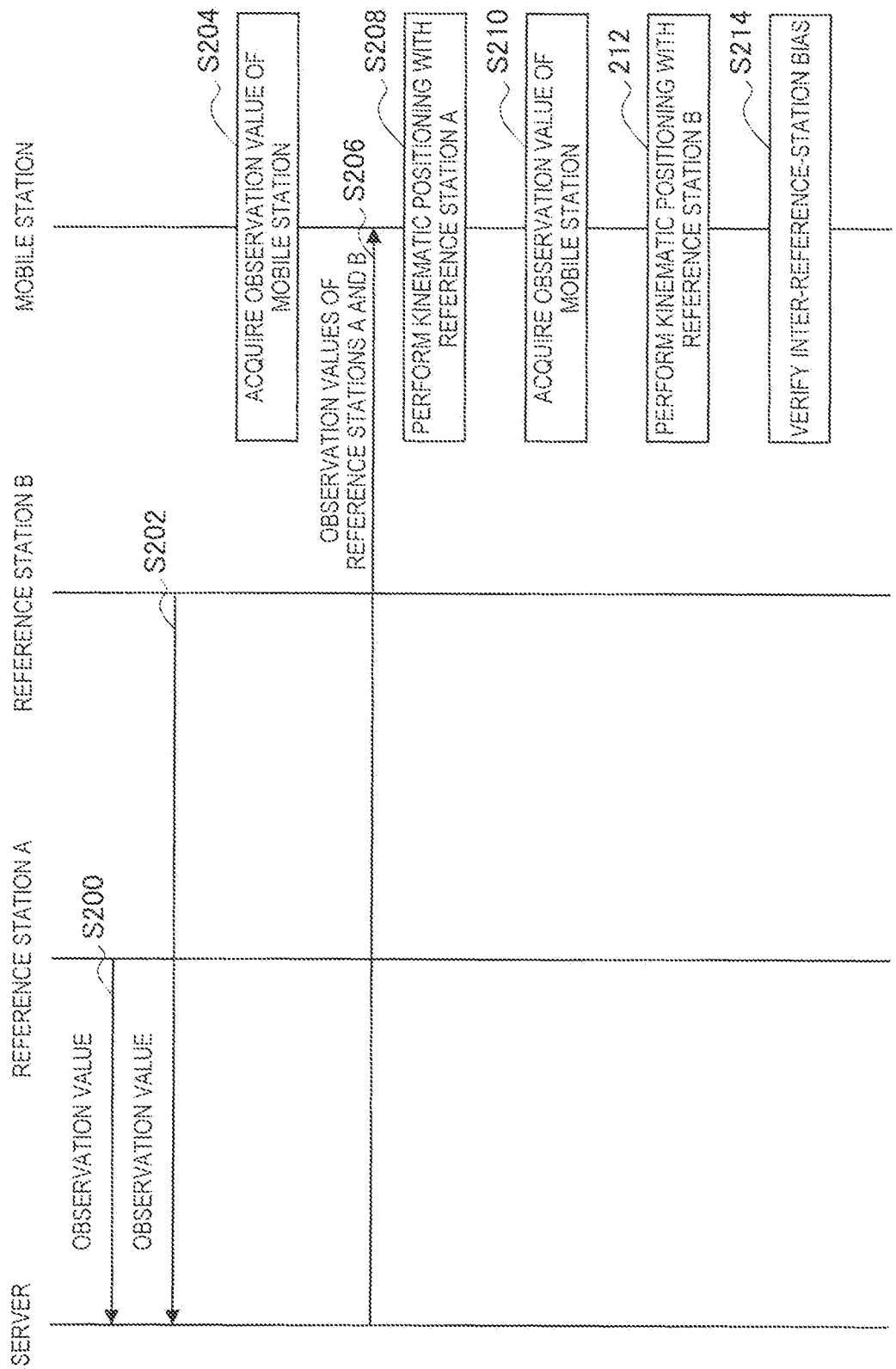
FIG. 9 is a sequence diagram illustrating an operation example in which the mobile station verifies the inter-reference-station integer bias in the present embodiment of the present disclosure.

FIG. 9 is a sequence diagram in which the above-described inter-reference-station integer bias is verified. As described above, in S200 and S202, the reference station A204 and the reference station B206 continuously transmit observation values to the server 500. In addition, in S204, the mobile station 300 receives radio waves from the GPS satellite 100 with the GPS reception unit 302 to acquire an observation value.

Next, in S206, the server 500 transmits the respective observation values received from the reference station A204 and the reference station B206 to the mobile station 300. In addition, in S208, the mobile station 300 uses the received observation values to perform kinematic positioning with the reference station A204 and the reference station B206. In S210, the mobile station 300 then calculates an inter-reference-station integer bias on the basis of a formula (14), and verifies the inter-reference-station integer bias with the inter-reference-station integer bias received from the server 500.

Note that positioning may be performed in S208 between the reference station A204 and the reference station B206, and the mobile station 300 in parallel or at different timing. Performing positioning at different timing distributes the calculation load on the positioning unit 308 of the mobile station 300. At this time, to improve the verification and positioning accuracy, the mobile station 300 may store an observation value observed by the mobile station 300 in a storage unit, and use the observation value observed by the mobile station 300 for verification and positioning at the same time as the received observation values of the reference stations.

6. Another System Configuration of the Present Disclosure

Figure 10:
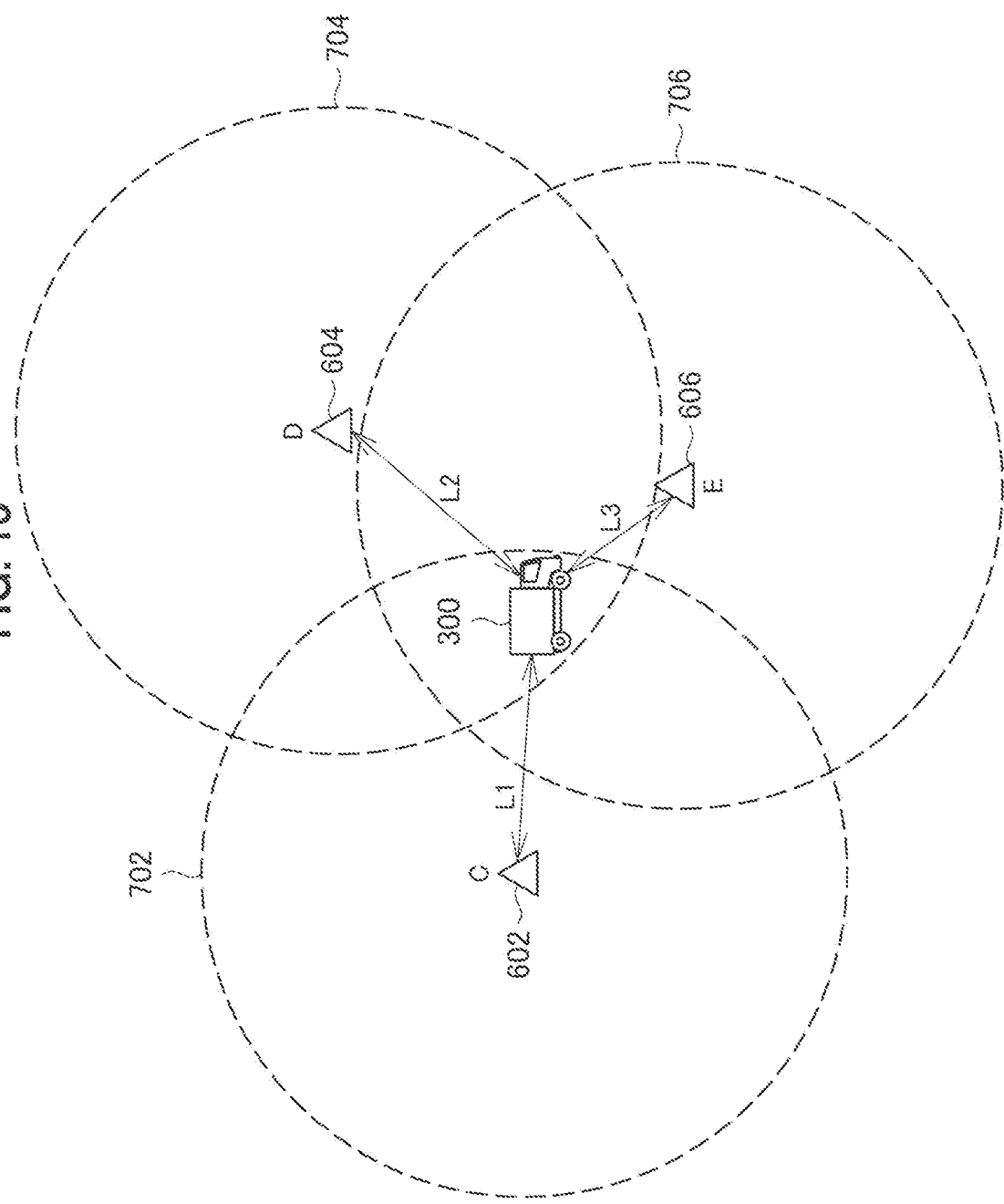
FIG. 10 is a schematic diagram illustrating another configuration of the system according to an embodiment of the present disclosure.

The above describes one example of the system configuration according to the present disclosure. FIG. 10 describes another example of the system configuration according to the present disclosure. Specifically, in another system configuration, a reference station C602, a reference station D604, and a reference station E606 illustrated in FIG. 10 emit radio waves from themselves. In addition, for example, each of reference stations 602, 604, and 606 is configured to emit radio waves including information for identifying each of the reference stations 602, 604, and 606. Circles 702, 704, and 706 illustrated by dashed lines in FIG. 10 represent areas that radio waves reach from the respective reference stations 602, 604, and 606. These areas represented by the circles 702, 704, and 706 are herein defined as radio wave arrival areas of the respective reference stations 602, 604, and 606.

Here, an interface of radio waves emitted from a reference station may be an interface used for a wireless LAN such as Bluetooth (registered trademark) or Wi-Fi, or a mobile telephone network such as Long Term Evolution (LTE).

According to this system configuration, the mobile station 300 observes the radio wave strength from each of the reference stations 602, 604, and 606 with the communication unit 310. At this time, if each of the reference stations 602, 604, and 606 emits radio waves with the same strength, the mobile station 300 can determine, by observing this radio wave strength, which reference station is the closest reference station among a plurality of reference stations.

More specifically, in FIG. 10, the mobile station 300 falls within the radio wave arrival areas 702, 704, and 706 of the respective reference stations 602, 604, and 606. The communication unit 310 of the mobile station 300 measures the radio wave strength of radio waves from each of the reference stations 602, 604, and 606, and sends the measured radio wave strength to the processing unit 304 as reception strength. The processing unit 304 estimates the closest reference station from the mobile station 300 on the basis of the reception strength received by the communication unit 310. In addition, the mobile station 300 may estimate the distance from the mobile station 300 to each of the reference stations 602, 604, and 606 on the basis of the reception strength received by the communication unit 310. Note that, in the example of FIG. 10, the communication unit 310 receives radio waves having the greatest radio wave strength from the reference station E606.

In the case where the processing unit 304 estimates the distance to a reference station on the basis of the reception strength, the distance from the mobile station 300 to the respective reference stations 602, 604, and 606 which is estimated by the processing unit 304 is represented as L1, L2, and L3 in FIG. 10. The processing unit 304 determines on the basis of the reception strength received by the communication unit 310 that the distance L3 to the reference station E606 is the shortest. The processing unit 304 then acquires information for identifying the reference station E606 from radio waves emitted from the reference station E606.

Next, the mobile station 300 transmits this information for identifying the reference station E606 to the server 500. The server 500, which receives the information for identifying the reference station E606, recognizes the reference station E606 as a reference station serving as the next switching destination on the basis of this identification information. The server 500 then calculates an inter-reference-station integer bias with the reference station E606 recognized as a reference station serving as a switching destination, and transmits the calculated inter-reference-station integer bias to the mobile station 300.

The mobile station 300, which receives the inter-reference-station integer bias, uses the received inter-reference-station integer bias to calculate an integer bias between the mobile station 300 and the reference station E606 on the basis of a formula (12). Such a configuration allows the mobile station 300 to switch reference stations without initialization. In addition, the mobile station 300 can perform positioning with the closest reference station, and thus stably calculate an accurate integer bias. This allows the mobile station 300 to perform accurate positioning.

According to the configuration described above, the mobile station 300 calculates the closest reference station from the radio wave strength of radio waves emitted from reference stations, and thus the mobile station 300 does not have to transmit the current location, which corresponds to S110 of FIG. 7. In addition, the server 500 does not have to search for a reference station in the vicinity of the mobile station 300, which corresponds to S112 of FIG. 7, because the mobile station 300 issues a notification of a reference station serving as a switching destination. Configured in this way, the mobile station 300 and the server 500 have less processing loads.

The above describes the example in which each of the reference stations 602, 604, and 606 emits radio waves including information for identifying the reference station. However, the reference station may emit radio waves including information indicating the position of the reference station in addition to the information for identifying the reference station.

According to such a configuration, the mobile station 300 can calculate the straight-line distance from the mobile station 300 to the reference station from the position of the mobile station 300 and the received position of the reference station. Such a configuration allows the mobile station 300 to calculate the distance from the mobile station 300 to the reference station without relying on the radio wave strength. Accordingly, it is possible to more accurately determine the closest reference station.

Note that, in the example of this system, the configuration that an observation value observed by each reference station is broadcast may be adopted. If the system is configured in this way, for example, the broadcast observation value can be received by the mobile station 300, and the integer bias estimation unit 306 can calculate and acquire an inter-reference-station integer bias. Using this inter-reference-station integer bias calculated by the integer bias estimation unit 306, the integer bias estimation unit 306 may calculate an integer bias between the reference station serving as a switching destination and the mobile station 300. According to such a configuration, a heavy load is imposed on the processing unit 304 of the mobile station 300, but there is no need to use the server 500 as the system. Accordingly, the system configuration can be made simpler.

7. Supplemental Information

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in FIG. 9, an inter-reference-station integer bias may be verified by the server 500. The mobile station 300 then transmits an observation value acquired in S204 to the server 500. The server 500, which receives the observation value from the mobile station 300, also uses observation values received from the reference station A204 and the reference station B206 to calculate integer biases between the reference station A204 and the reference station B206, and the mobile station 300.

The server 500 can then verify the inter-reference-station integer bias on the basis of the calculated integer biases between the reference station A204 and the reference station B206, and the mobile station 300. In this case, the mobile station 300 just transmits observation values, and thus the mobile station 300 has less processing loads on the processing unit 304. Therefore, in the mobile station 300 having limited capacity in general, it is possible to reduce processing loads and leave the processing to the server 500 having enormous capacity.

In addition, in the case where a reference station used by the mobile station 300 chiefly includes not a public, but unique system, an inter-reference-station integer bias may be verified with the released observation value of an electronic reference point installed by Geospatial Information Authority of Japan. Such a configuration improves the accuracy of the inter-reference-station integer bias described above, and allows the mobile station 300 to perform accurate positioning.

In addition, the server 500 may calculate inter-reference-station integer biases of various combinations of reference stations, and broadcast the calculated inter-reference-station integer biases of the various combinations of reference stations. For example, in the case where the mobile station 300 selects the closest reference station on the basis of the reception strength of radio waves emitted from reference stations, the mobile station 300 may receive a broadcast inter-reference-station integer bias. The mobile station 300 then receives the broadcast inter-reference-station integer bias with the communication unit 310, and stores the broadcast inter-reference-station integer bias in the storage unit or the like. When switching reference stations, the mobile station 300 may then select an inter-reference-station integer bias between a reference station serving as a switching source and a reference station serving as a switching destination from the inter-reference-station integer biases stored in the storage unit, and use the inter-reference-station integer bias to perform kinematic positioning. Configured in this way, the mobile station 300 does not have to transmit the current position to the server 500. In addition, the positioning unit 308 can perform positioning according to an extremely simple calculation.

Note that the scope of the present disclosure includes a computer program for causing the processing unit 304 including the integer bias estimation unit 306 and the positioning unit 308 to operate as described above. In addition, there may be provided a storage medium having such a program stored therein.

8. Conclusion

As described above, according to an embodiment of the present disclosure, the mobile station 300 acquires an inter-reference-station integer bias between a reference station serving as a switching source and a reference station serving as a switching destination, and calculates an integer bias between the reference station serving as a switching destination and the mobile station 300. Such a configuration allows the mobile station 300 to switch reference stations without initialization. Note that, as understood from the above-described embodiment, an inter-reference-station integer bias may be received and acquired from another apparatus, and also calculated by the mobile station 300 and acquired.

In addition, a reference station serving as a switching destination is selected from a plurality of installed reference stations on the basis of information regarding the current location which is transmitted from the mobile station 300 or the reception strength of radio waves that are received by the mobile station 300 and emitted from each reference station. Such a configuration allows the mobile station 300 to perform positioning with the closest reference station, and thus stably calculate an accurate integer bias. This allows the mobile station 300 to perform accurate positioning.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:
a GPS reception unit configured to receive a radio wave from a satellite; and
a processing unit configured to calculate an integer bias between a first reference station and the information processing apparatus on a basis of the radio wave from the satellite, in which
the processing unit acquires an inter-reference-station integer bias between a second reference station different from the first reference station and the first reference station, and
the processing unit calculates an integer bias between the information processing apparatus and the second reference station on a basis of the integer bias between the first reference station and the information processing apparatus, and the inter-reference-station integer bias between the first reference station and the second reference station.

(2)

The information processing apparatus according to (1), further including:
a communication unit configured to transmit a signal, in which
the communication unit transmits a position of the information processing apparatus to a server that selects the second reference station.

(3)

The information processing apparatus according to (2), in which
the second reference station is located at a position closest to the information processing apparatus among a plurality of reference stations.

(4)

The information processing apparatus according to (1), further including:
a communication unit configured to receive a radio wave emitted from the second reference station, in which
the processing unit selects the second reference station on a basis of reception strength of the radio wave emitted from the second reference station.

(5)

The information processing apparatus according to (4), in which
the processing unit selects a reference station having greatest reception strength of a radio wave from a plurality of reference stations as the second reference station.

(6)

The information processing apparatus according to any one of (1) to (5), in which the processing unit performs kinematic positioning in cooperation with the first reference station or the second reference station.

(7)

The information processing apparatus according to any one of (1) to (5), in which the processing unit further calculates the integer bias between the second reference station and the information processing apparatus on the basis of the radio wave from the satellite, the processing unit calculates an inter-reference-station integer bias on a basis of the integer bias between the first reference station and the information processing apparatus, and the integer bias between the second reference station and the information processing apparatus, and the processing unit verifies the received inter-reference-station integer bias on a basis of the calculated inter-reference-station bias.

(8)

A calculation method including:

receiving a radio wave from a satellite;

calculating an integer bias between a first reference station and an information processing apparatus on a basis of the radio wave from the satellite;

acquiring an inter-reference-station integer bias between a second reference station different from the first reference station and the first reference station; and calculating an integer bias between the information processing apparatus and the second reference station on a basis of the integer bias between the first reference station and the information processing apparatus, and the inter-reference-station integer bias between the first reference station and the second reference station.

(9)

A positioning system including:

a first reference station whose position is known and a second reference station different from the first reference station, the first reference station receiving a radio wave from a satellite; and an information processing apparatus configured to perform positioning on a basis of the radio wave from the satellite, in which the information processing apparatus includes a GPS reception unit configured to receive the radio wave from the satellite, and a processing unit configured to calculate an integer bias between the first reference station and the information processing apparatus on the basis of the radio wave from the satellite, the processing unit acquires an inter-reference-station integer bias between the first reference station and the second reference station, and the processing unit calculates an integer bias between the information processing apparatus and the second reference station on a basis of the integer bias between the first reference station and the information processing apparatus, and the inter-reference-station integer bias between the first reference station and the second reference station.

REFERENCE SIGNS LIST

100 GPS satellite
200 reference station
300 mobile station
302 GPS reception unit
304 processing unit
306 integer bias estimation unit
308 positioning unit
310 communication unit
400 network
500 server

The invention claimed is:

1. A movable information processing apparatus, comprising:
   a GPS reception unit configured to receive a plurality of radio waves from a plurality of satellites, wherein the plurality of satellites further transmits the plurality of radio waves to a first reference station and a second reference station;
   a communication unit configured to:
      communicate with a server, the first reference station, and the second reference station,
      measure a reception strength of a radio wave emitted from the first reference station, and
      measure a reception strength of a radio wave emitted from the second reference station; and
   a processing unit configured to:
      acquire, from the server via the communication unit, a first observation value of the first reference station, wherein the first observation value is based on the plurality of radio waves from the plurality of satellites;
      calculate a first integer bias between the first reference station and the movable information processing apparatus based on the acquired first observation value and an observation value of the movable information processing apparatus, wherein the observation value of the movable information processing apparatus is based on the plurality of radio waves from the plurality of satellites, the first integer bias indicates a relative position of the movable information processing apparatus with respect to the first reference station;
      acquire, from the server via the communication unit, an inter-reference-station integer bias between the second reference station and the first reference station, wherein
         the inter-reference-station integer bias is calculated based on the first observation value and a second observation value of the second reference station, the second observation value is based on the plurality of radio waves from the plurality of satellites, and the inter-reference-station integer bias indicates a relative position of the second reference station with respect to the first reference station;
      calculate a second integer bias between the movable information processing apparatus and the second reference station based on the calculated first integer bias and the acquired inter-reference-station integer bias, wherein the second integer bias indicates a relative position of the movable information processing apparatus with respect to the second reference station; and
      switch to the second reference station from the first reference station, based on the reception strength of the radio wave emitted from the second reference station to the movable information processing apparatus and the calculated second integer bias, wherein the reception strength of the radio wave emitted from the second reference station is greater than the reception strength of the radio wave emitted from the first reference station.

2. The movable information processing apparatus according to claim 1, wherein
the communication unit is further configured to transmit a signal to the server,
the transmitted signal includes a position of the movable information processing apparatus, and
the server selects the second reference station based on the transmitted position of the movable information processing apparatus.

3. The movable information processing apparatus according to claim 2, wherein the second reference station is located at a position closest to the movable information processing apparatus among a plurality of reference stations.

4. The movable information processing apparatus according to claim 1, further comprising a communication unit configured to receive the radio wave emitted from the second reference station.

5. The movable information processing apparatus according to claim 1, wherein the processing unit is further configured to execute a kinematic positioning operation in association with at least one of the first reference station or the second reference station.

6. A calculation method, comprising:
receiving, by a GPS reception unit in a movable information processing apparatus, a plurality of radio waves from a plurality of satellites, wherein the plurality of satellites further transmits the plurality of radio waves to a first reference station and a second reference station;
communicating with a server, the first reference station, and the second reference station;
measuring a reception strength of a radio wave emitted from the first reference station;
measuring a reception strength of a radio wave emitted from the second reference station;
acquiring, from the server via the communication unit, a first observation value of the first reference station, wherein the first observation value is based on the plurality of radio waves from the plurality of satellites;
calculating, by the processing unit in the movable information processing apparatus, a first integer bias between the first reference station and the movable information processing apparatus based on the acquired first observation value and an observation value of the movable information processing apparatus, wherein the observation value of the movable information processing apparatus is based on the plurality of radio waves from the plurality of satellites, the first integer bias indicates a relative position of the movable information processing apparatus with respect to the first reference station;
acquiring, from the server via the communication unit, an inter-reference-station integer bias between the second reference station and the first reference station, wherein
the inter-reference-station integer bias is calculated based on the first observation value and a second observation value of the second reference station,
the second observation value is based on the plurality of radio waves from the plurality of satellites, and
the inter-reference-station integer bias indicates a relative position of the second reference station with respect to the first reference station;
calculating, by the processing unit in the movable information processing apparatus, a second integer bias between the movable information processing apparatus and the second reference station based on the calculated first integer bias and the acquired inter-reference-station integer bias, wherein the second integer bias indicates a relative position of the movable information processing apparatus with respect to the second reference station; and
switching to the second reference station from the first reference station, based on the reception strength of the radio wave emitted from the second reference station to the movable information processing apparatus and the calculated second integer bias, wherein the reception strength of the radio wave emitted from the second reference station is greater than the reception strength of the radio wave emitted from the first reference station.

7. A system, comprising:
a first reference station configured to receive a plurality of radio waves from a plurality of satellites;
a second reference station configured to receive the plurality of radio waves from the plurality of satellites, wherein
the first reference station is at a specific position, and
the first reference station is different from the second reference station;
a movable information processing apparatus configured to execute a positioning operation based on the plurality of the radio waves from the plurality of satellites, wherein the movable information processing apparatus includes:
a GPS reception unit configured to receive the plurality of radio waves from the plurality of satellites;
a communication unit configured to:
communicate with a server, the first reference station, and the second reference station,
measure a reception strength of a radio wave emitted from the first reference station, and
measure a reception strength of a radio wave emitted from the second reference station, and
a processing unit configured to:
acquire, from the server via the communication unit, a first observation value of the first reference station, wherein the first observation value is based on the plurality of radio waves from the plurality of satellites,
calculate a first integer bias between the first reference station and the movable information processing apparatus based on the acquired first observation value and an observation value of the movable information processing apparatus, wherein
the observation value of the movable information processing apparatus is based on the plurality of radio waves from the plurality of satellites, and
the first integer bias indicates a relative position of the movable information processing apparatus with respect to the first reference station,
acquire, from the server via the communication unit, an inter-reference-station integer bias between the first reference station and the second reference station, wherein
the inter-reference-station integer bias is calculated based on the first observation value and a second observation value of the second reference station, and the inter-reference-station integer bias indicates a relative position of the second reference station with respect to the first reference station, calculate a second integer bias between the movable information processing apparatus and the second reference station based on the calculated first integer bias and the acquired inter-reference-station integer bias, wherein the second integer bias indicates a relative position of the movable information processing apparatus with respect to the second reference station, and switch to the second reference station from the first reference station, based on the reception strength of the radio wave emitted from the second reference station to the movable information processing apparatus and the calculated second integer bias, wherein the reception strength of the radio wave emitted from the second reference station is greater than the reception strength of the radio wave emitted from the first reference station.

* * * * *